(12) United States Patent
Ball et al.

(10) Patent No.: US 7,657,867 B2
(45) Date of Patent: *Feb. 2, 2010

(54) SYSTEM AND METHOD FOR GENERATING A PREDICATE ABSTRACTION OF A PROGRAM

(75) Inventors: Thomas J. Ball, Mercer Island, WA (US); Sriram K. Rajamani, Bellevue, WA (US); Todd D. Millstein, Seattle, WA (US); Rupak Majumdar, Albany, CA (US)

(73) Assignee: Microsoft Corporation, Redmond, WA (US)

( * ) Notice: Subject to any disclaimer, the term of this patent is extended or adjusted under 35 U.S.C. 154(b) by 886 days.

This patent is subject to a terminal disclaimer.

(21) Appl. No.: 11/155,458

(22) Filed: Jun. 17, 2005

(65) Prior Publication Data

US 2005/0235257 A1 Oct. 20, 2005

Related U.S. Application Data

(63) Continuation of application No. 10/136,881, filed on Apr. 30, 2002, now Pat. No. 7,058,925.

(51) Int. Cl.
*G06F 9/44* (2006.01)
(52) U.S. Cl. ...................................... 717/106
(58) Field of Classification Search .................. 717/106
See application file for complete search history.

(56) References Cited

U.S. PATENT DOCUMENTS 5,963,739 A * 10/1999 Homeier ..................... 717/126
7,346,486 B2 * 3/2008 Ivancic et al. ................ 703/22
2005/0229044 A1 * 10/2005 Ball .............................. 714/38

OTHER PUBLICATIONS

Ball et al., "Checking Temporal Properties of Software with Boolean Programs", by Thomas Ball and Sriram K. Rajamani, "Proceedings of the Workshop on Advances in Verification", Jul. 2000.*
Ball et al., "Automatic Predicate Abstraction of C Programs," Programming Language Design and Implementation (PLDI '01), Snowbird, Utah, 11 pp. (May 2001).*
Das et al., "Experience With Predicate Abstraction" Computer-Aided Verification (CAV'99), LNCS 1633, oo. 160-171 (1999).*
Tai, Kuo-Chung. "Predicate-Based Test Generation for Computer Programs", 1993, IEEE, pp. 267-276.*

* cited by examiner

*Primary Examiner*—Wei Y Zhen
*Assistant Examiner*—Chih-Ching Chow
(74) *Attorney, Agent, or Firm*—Merchant & Gould; Ryan T. Grace

(57) ABSTRACT

Described is a method that enables the automatic generation of a boolean program that is a predicate abstraction of a program written using a general programming language. The method is capable of abstracting code statements within the program that include procedure calls, assignments, goto statements, conditionals, and pointers. In accordance with the invention, predicates of interest are identified for each code statement in the program. For each particular code statement, the process generates predicate statements that describe an effect that the statement has on the predicates of interest. If the effect of a particular code statement is indeterminable, non-deterministic predicate statements are included in the boolean program to model the indeterminable nature of the code statement. In addition, if a particular code statement includes a procedure call, the arguments and return value of the procedure call are translated to associated predicates in the calling context.

17 Claims, 10 Drawing Sheets

```
1002
typedef struct cell {
    int val;
    struct cell* next;
} *list;

1008  list partition(list *l, int v) {
1006      list curr, prev, newl,
          nextCurr;
1018      curr = *l;
          prev = NULL;
          newl = NULL;
          while (curr != NULL) {
              nextCurr = curr->next;
              if (curr->val > v) {
                  if (prev != NULL) {
                      prev->next = nextCurr;
                      if (curr == *l) {
                          *l = nextCurr;
                      }
                      curr->next = newl;
              L:      newl = curr;
                  } else {
                      prev = curr;
                      curr = nextCurr;
                  }
                  return newl;
              }
          }
      }

1012  partition {
1014      curr == NULL, prev == NULL,  ─ 1015
1016      curr->val > v, prev->val > v  ─ 1017
      }
```

1010

ABSTRACTOR
(FIGS. 5-9)

202

1050
1051

```
1004
void partition() {
    bool {curr==NULL}, {prev==NULL};
    bool {curr->val>v}, {prev->val>v};   1031 1033  1032  1034
    {curr==NULL} = unknown();            // curr = *l
    {curr->val>v} = unknown();
    {prev==NULL} = true;                 // prev = NULL;
    {prev->val>v} = unknown();
    skip;                                // newl = NULL;
    while {
        assume(!{curr==NULL});           // while(curr!= NULL)
        skip;
        if (*) {
            assume({curr->val>v});       // nextCurr = curr_>next
            skip;                        // if (Curr->val > v) {
            if (*) {
                assume(!{prev==NULL});   // if (prev != NULL) {
                skip;                    // prev->next = nextCurr;
                                         //
            nextCurr;
            }
            if (*) {                     // if (curr == *l) {
                skip;                    // *l = nextCurr;
            }
        L:  skip;                        // curr->next = newl;
                                         // newl = curr
            } else {                     // } else {
                assume(!{curr->val>v});
                {prev==NULL} = {curr==NULL};   // prev = curr;
                {prev->val>v} = {curr->val>v};
            }
            {curr==NULL} = unknown();    // curr = nextCurr;
            {curr->val>v} = unknown();
        }
        assume({curr==NULL}); }
}
```

Fig. 10

SYSTEM AND METHOD FOR GENERATING A PREDICATE ABSTRACTION OF A PROGRAM

RELATED APPLICATIONS

This application is a continuation of application Ser. No. 10/136,881, filed Apr. 30, 2002, which application is incorporated herein by reference.

FIELD OF THE INVENTION

The present invention is directed at software verification tools, and more particularly to mechanisms for generating a predicate abstraction of a program.

BACKGROUND OF THE INVENTION

In many disciplines, such as aerodynamics, systems are modeled before finalizing the system design. The modeling of the system verifies that the system design satisfies functional and safety properties before the system is implemented. This modeling relies on mathematical analysis to verify all possible outcomes based on a set of allowed rules.

In contrast, currently, many software systems are verified by performing live testing, which means that the software systems are tested while they operate in a "real world" situation. When problems are identified, the software is modified to correct the problem. Once the software operates within a minimal acceptable reliability range, the live testing ends. Live testing is helpful in detecting major design flaws and certain programming errors. However, because it is nearly impossible to anticipate all the scenarios in which the software will operate and then test each scenario, the software will most likely still have errors after live testing.

Recently, there has been great interest in the possibility of modeling software systems. However, modeling software, which is an infinite-state system, becomes extremely difficult due to the state-space explosion problem associated with large systems. To overcome this problem, one approach constructs an abstract model of the software system, commonly referred to as a predicate abstraction. Based on the predicate abstraction, the concrete states of the software system are mapped to abstract states according to their evaluation under a finite set of predicates. While this technique is very useful, generating the predicate abstraction is very difficult. Currently, automatic predicate abstraction is performed on finite-state systems and on infinite-state systems with guarded commands. Both of these systems are restrictive in their application, and fall short of generating an automatic predicate abstraction on a program written using a general programming language, such as C and other industrial programming languages.

SUMMARY OF THE INVENTION

The present invention provides a technique for automatically generating a boolean program that is a predicate abstraction of a program written using a general programming language. The program includes a plurality of code statements that include procedure calls, assignments, goto statements, conditionals, and in some case includes pointers. Generally stated, the automatic predicate abstraction process receives several predicates that define relationships between various program variables and receives the program. For each code statement in the program, the process identifies one or more predicates of interest. The predicates of interest are predicates that may be affected by a particular code statement in the program. Then, for each particular code statement in the program, the process generates one or more predicate statements. The predicate statements describe an effect that the particular code statement has on the one or more predicates of interest. These predicate statements thus form the boolean program.

If the effect of a particular code statement in the program is indeterminable based on the predicates of interest, one or more non-deterministic predicate statements are included in the boolean program to model the indeterminable nature of the code statement. In addition, if a particular code statement includes a procedure call, the arguments of the procedure call and the return value are translated to associated predicates in the calling context.

BRIEF DESCRIPTION OF THE DRAWINGS

FIG. 10 graphically illustrates an exemplary program and a corresponding boolean program generated in accordance with the present invention.

DETAILED DESCRIPTION OF THE PREFERRED EMBODIMENT

Briefly stated, the present invention automatically generates a predicate abstraction based on a supplied list of predicates and a program. In accordance with the invention, the predicate abstraction includes predicate statements that model the effect of a code statement in the program on the supplied list of predicates.

Illustrative Operating Environment

Figure 1:
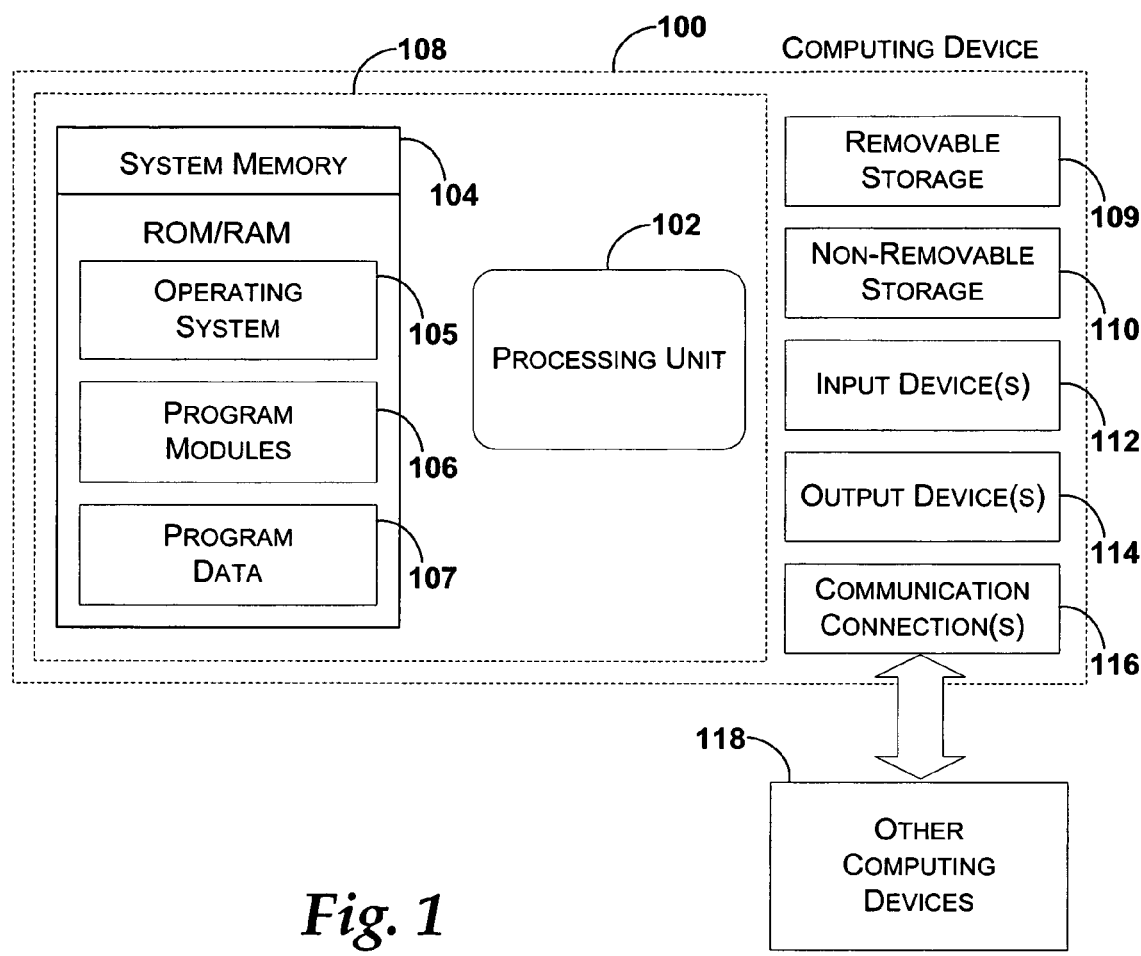
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Software Verification Environment

Figure 2:
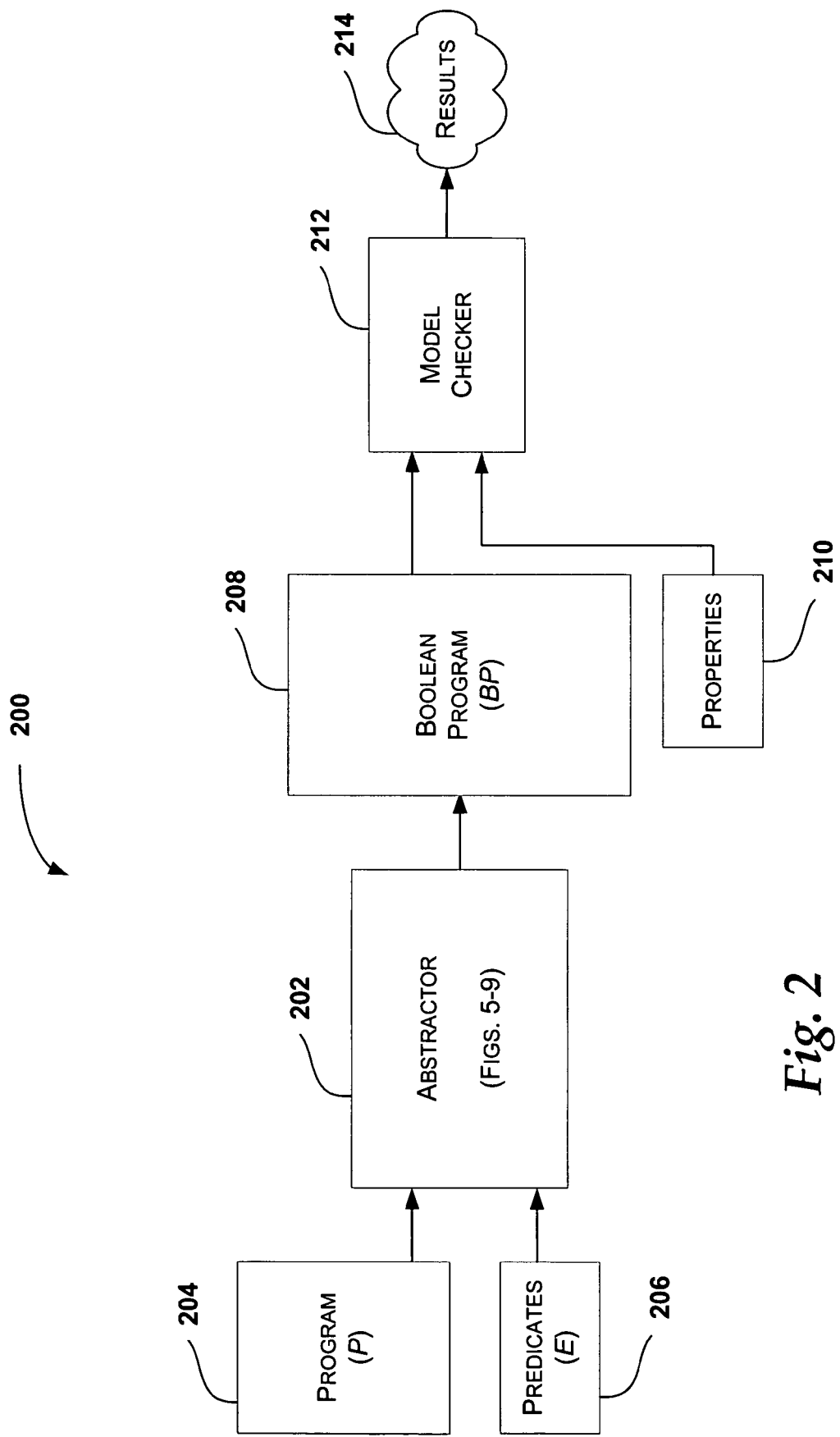
FIG. 2 is a block diagram illustrating an exemplary environment.

FIG. 2 is a block diagram illustrating an exemplary environment for practicing the present invention. The exemplary environment shown in FIG. 2 is a software verification environment 200. The goal in this software verification environment 200 is to verify that program 204 will operate properly in any reachable state. Program 204 is also referred to as program P later in equations. The software verification environment 200 includes an abstractor 202 and a model checker 212. Abstractor 202 takes program 204 as input. Program 204 may be written using any high-level programming language, any industrial programming language, and the like (e.g., "C" programming language). Abstractor 202 also receives a set of predicates 206. Predicates 206 define relationships between program variables that will be tracked in the abstract program 204. Predicates 206 are pure boolean expressions and do not contain any function calls. The set of predicates 206 is referred to as predicates E later in equations.

The abstractor 202 automatically generates a boolean program 208 based on program 204 and predicates 206. Thus, boolean program 208 is the predicate abstraction of program 204 with reference to predicates 206. The boolean program 208 has a similar control-flow structure as program 204. Boolean program 208 is referred to as boolean program BP later in equations. Each code statement S (not shown) in program 204 has at least one corresponding predicate statement S' (not shown) in the boolean program 208. The code statements include procedure calls, assignments, gotos, conditionals and the like. The boolean program 208 generated in accordance with the present invention is guaranteed to be an abstraction of program 204 because the set of execution traces of the boolean program 208 is a superset of the set of execution traces of program 204. Therefore, any tool that verifies the operation of boolean program 208, is also verifying the operation of program 204. One such tool is model checker 212.

Model checker 212 inputs the boolean program 208 and a list of properties 210. For each predicate statement S' in the boolean program 208, the model checker 212 computes a set of reachable states. In one embodiment, the model checker 212 implements an inter-procedural dataflow analysis process. An illustrative inter-procedural dataflow analysis process may be based on the inter-procedural dataflow analysis algorithm described in the book entitled "Program Flow Analysis: Theory and Applications", by M. Sharir and A. Pnueli, pages 189-233, Prentice-Hall, 1981, and in the article entitled "Precise Interprecedural Dataflow Analysis via Graph Reachability", by T. Reps, S. Horwitz, and M. Sagiv, pages 49-61, ACM, 1995. While the details of the model checker 212 is not necessary for an understanding of the present invention, a brief overview of one exemplary model checker 212 provides insight into the significance of the predicate abstractor of the present invention.

In general, model checker 212 updates boolean variables (not shown) that are in scope at statement S'. The model checker 212 then computes a set of reachable states for each statement S' of the boolean program 208 based on the boolean variables in scope. The model checker 212 then outputs results 214. Results 214 may include invariants representing the reachable states at any particular point of the boolean program 208. These invariants may be used for many different purposes, such as to refine alias information for pointers. The results 214, thus, provide insight into the invariant state of the program 204 at a corresponding point.

Figure 3:
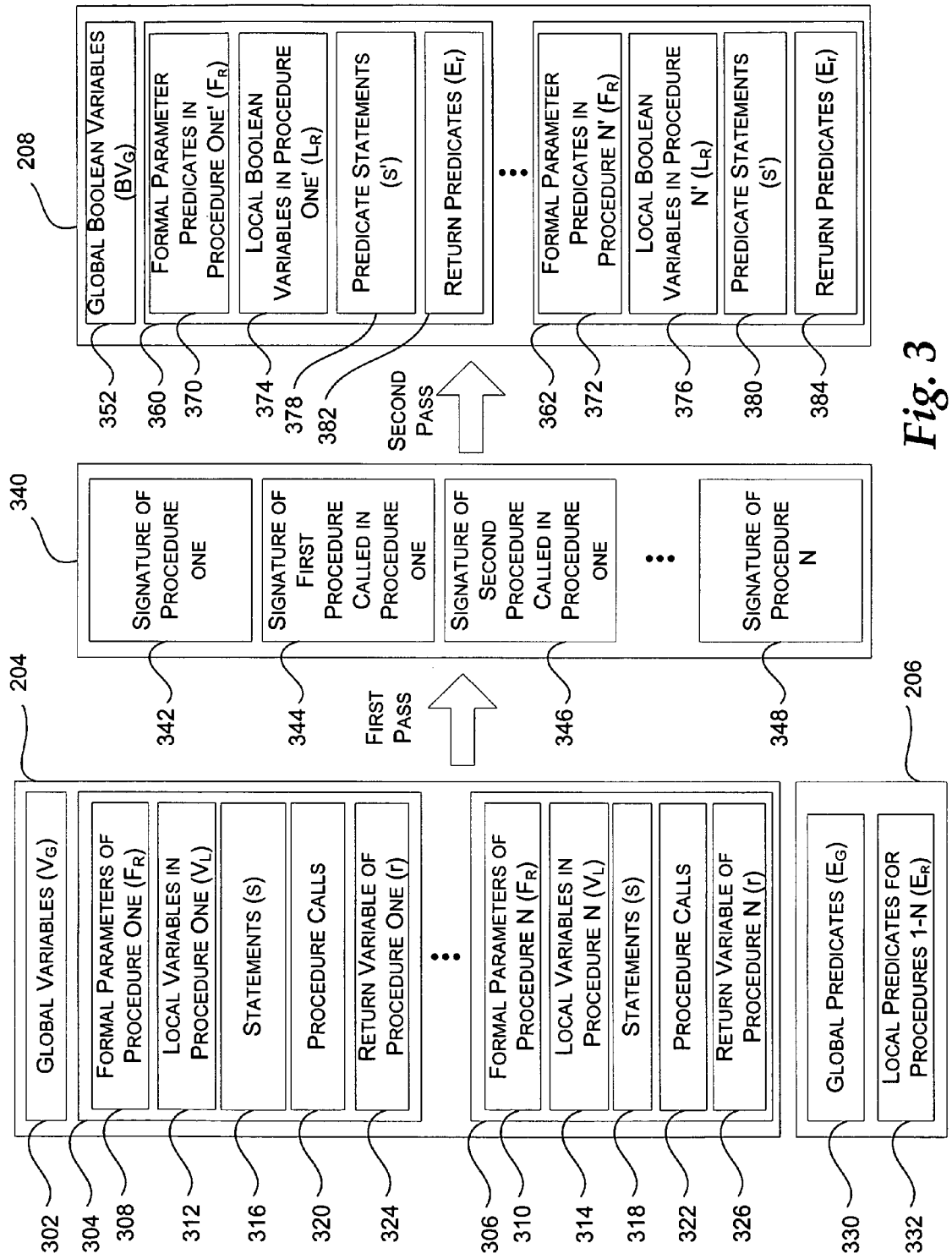
FIG. 3 is a block diagram graphically illustrating the generation of a boolean program from a program in the exemplary environment illustrated in FIG. 2.

FIG. 3 is a block diagram that graphically illustrates the phases of one exemplary predicate abstraction process for generating a boolean program 208 based upon the input of program 204 and predicates 206. As mentioned above, program 204 is created using an industrial programming language, such as C. As such, program 204 includes a set of global variables 302 and several procedures (e.g., procedures 304 and 306). Each procedure 304-306 includes a set of formal parameters (e.g., formal parameters 308-310), a set of local variables (e.g., local variables 312-314), and a set of statements (e.g., statements 316-318). The formal parameters 308-310 include arguments that are passed by-value or by-reference in the procedure call. The local variables 312-314 include identifiers that have a scope that is local with respect to the procedure. In addition, each procedure 304-306 could include one or more procedure calls (e.g., procedure calls 320-322) and could include a return variable (e.g., return variable 324-326). In the equations below, the global variables 302 are referred to as global variables $V_G$, the procedures 304-306 are referred to as procedures R, the formal parameters 308-310 are referred to as formal parameters $F_R$, the local variables 312-314 are referred to as local variables $L_R$, the statements 316-318 are referred to as statements S, and the return variables 324-326 are referred to as return variables r.

Now, in accordance with the present invention, the predicates 206 include a set of local predicates 332 for each procedure and a set of global predicates 330. The global predicates 330 represent relationships between global variables whose scope includes the entire program 204. The local predicates 332 represent relationships that involve local variables whose scope includes the associated procedure 304-306. In the equations below, the global predicates are referred to as global predicates $E_G$ and the local predicates 332 are referred to as local predicates $E_R$.

On a first pass, the abstractor 202 generates a set of call procedure signatures 340. The set of call procedure signatures 340 includes a signature (e.g., signatures 342-348) for each procedure 304-306, 320-322 that is called within program 204. For example, signature 342 corresponds to procedure 304; signature 344 corresponds to one of the procedure calls 320 called within procedure 304; signature 346 corresponds to another procedure call called from within procedure 304; and signature 348 corresponds to procedure 306. The syntax for the signatures 342-348 will be discussed in further detail later in conjunction with FIG. 4.

On a second pass, the abstractor 202 generates predicate statements for the boolean program 208. Briefly, the boolean program 208 is generated by translating each procedure (e.g., procedures 304-306) into a corresponding boolean procedure (e.g., boolean procedures 360-362). When translating each procedure into a corresponding boolean procedure, each statement (e.g., statement 316) in the procedure is translated into one or more predicate statements (e.g., predicate statements 378-380) in the boolean program 208. Some of the predicate statements 378-380 are generated based on the associated call procedure signature.

The boolean program 208 includes a set of global boolean variables 352. In addition, for each of the corresponding boolean procedures 360-362, the boolean program includes a set of local boolean variables (e.g., local boolean variables 374-376), a set of predicate statements (e.g., predicate statements 378-380), and return predicates (e.g., return predicates 382-384). The set of predicate statements 378-380 model statements 316-320 in program 204. As will be described in greater detail below, typically, there will be one or more predicate statements 378-380 for each statement 316-318. In general, the set of predicate statements 378-380 reflect the effect that the corresponding statement 316-318 will have upon any of the global predicates 330 and local predicates 332 that are in scope when the statement is processed. In the equations below, the global boolean variables 352 are referred to as global boolean variables $BV_G$, the local boolean variables 374-376 are referred to as local boolean variables $L_R$, and predicate statements 378-380 are referred to as predicate statements S'.

Figure 4:
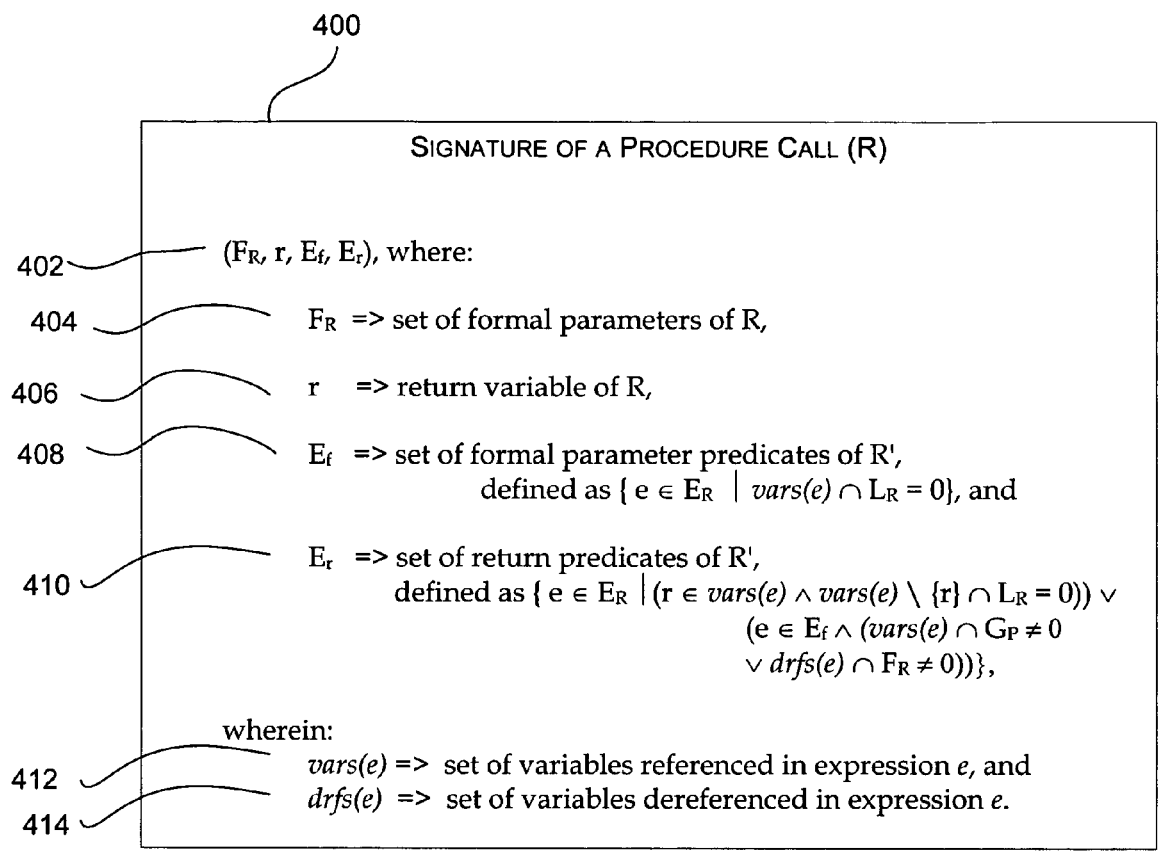
FIG. 4 illustrates an exemplary definition for a procedure call signature for use in abstracting a procedure call shown in FIG. 3.

FIG. 4 illustrates an exemplary syntax 400 for defining a procedure call signature 342-348 in accordance with the present invention. Before describing the syntax 400, a few terms are defined to aid in understanding. A predicate refers to a pure boolean expression that uses variables (e.g., global variables 302, formal parameters 304-306, and local variables 308-310) of the program 204 and constants of the programming language. For example, x<5 and x=2 could be predicates. For each predicate, the boolean program 208 has an associated boolean variable (e.g., local boolean variable 354) that corresponds to the predicate. Thus, for a set of predicates $E=\{\phi_1, \phi_2, \ldots, \phi_n\}$, there are an associated n boolean variables, $V=\{b_1, b_2, \ldots, b_n\}$, in the boolean program 208.

Each predicate $\phi$ is defined as either local, global, or formal based on the scope of the variables in program 204 that are associated with the predicate. If the scopes of the associated variables are global, the predicate $\phi$ is defined as a global predicate $\phi_G$. If the scopes of the associated variables are local, the predicate $\phi$ is defined as a local predicate $\phi_L$. If the scopes of the associated variables are local, formal parameter, and global, the predicate $\phi$ is defined as a local predicate $\phi_L$. If the scopes of the associated variables are global and formal parameters, the predicate $\phi$ is defined as a formal predicate $\phi_F$.

An example is now described to clarify the above definitions. The example includes two procedures, bar( ) and foo( ). Both of these two procedures, bar( ) and foo( ), along with their predicates are shown in the following two tables, Table 1 and Table 2, respectively.

TABLE 1

| bar( ) procedure | bar( ) predicates |
|---|---|
| int bar(int* q, int y) {<br>  int l1, l2;<br>  ...<br>  return l1;<br>} | bar {<br>  y >= 0,<br>  *q <= y,<br>  y == l1,<br>  y > l2<br>} |

TABLE 2

| foo( ) procedure | foo( ) predicates |
|---|---|
| void foo(int* p, int x) {<br>  int r;<br>  if (*p <= x)<br>    *p = x;<br>  else<br>    *p = *p + x;<br>  r = bar(p, x);<br>  ...<br>} | foo {<br>  *p <= 0,<br>  x == 0,<br>  r == 0<br>}. |

Based on the above definitions for local, global and formal predicates, y>=0 in procedure bar( ) is a formal predicate because y has a local scope in bar( ) and y>=0 does not refer to any local variables of procedure bar( ). Likewise, *q<=y, *p<=0, and x==0 are formal predicates. Even though the variables "x" and "p" appear in statements within foo( ), neither variable refers to any local variables of procedure foo( ). The following are local predicates, y==l1, y>l2, and r==0, because the scope of the associated variables in the predicates have a local scope.

Now, returning to the call procedure syntax 400 shown in FIG. 4, the procedure call signature 402 includes a four-tuple within parenthesis. An "$F_R$" element 404 represents the set of formal parameters (e.g., formal parameters 308 in FIG. 3) of the procedure that is being abstracted from program 204. An "r" element 406 represents the return variable (e.g., return variable 324 in FIG. 3) of the procedure that is being abstracted. An "$E_f$" element 408 represents the set of formal parameter predicates (e.g., formal parameter predicates 370) of the associated boolean procedure. As shown in the definition, $E_f$ is the subset of predicates that are local to the procedure (i.e., $E_R$) but do not refer to any local variables of the procedure. Thus, all predicates in $E_R - E_f$ will be local predicates in the corresponding boolean procedure 360-362.

An "$E_r$" element 410 is the set of return predicates (e.g., return predicate 382 in FIG. 3) of the associated boolean procedure 360-362. As shown by the definition in FIG. 4, $E_r$ contains the predicates in $E_R$ that mention the return variable r but do not mention any (other) local variables of the procedure 304-306. In addition, $E_r$ contains those predicates in $E_f$ that reference a global variable or dereference a formal parameter of the procedure.

These return predicates serve two purposes. First, the return predicates provide the calling procedure information about the return value r of the called procedure. Second, the return predicates provide the calling procedure with information about any global variables and any call-by-reference parameters. This is necessary so that the local predicates of the calling procedure may be evaluated precisely.

Continuing with the example illustrated in Tables 1 and 2 above, the signature of bar( ) is $(F_R, r, E_f, E_r)$ which equates to the following:

$$(\{y,q\}, \{l1\}, \{*q<=y, y>=0\}, \{y=l1, *q<=y\}).$$

Figure 5:
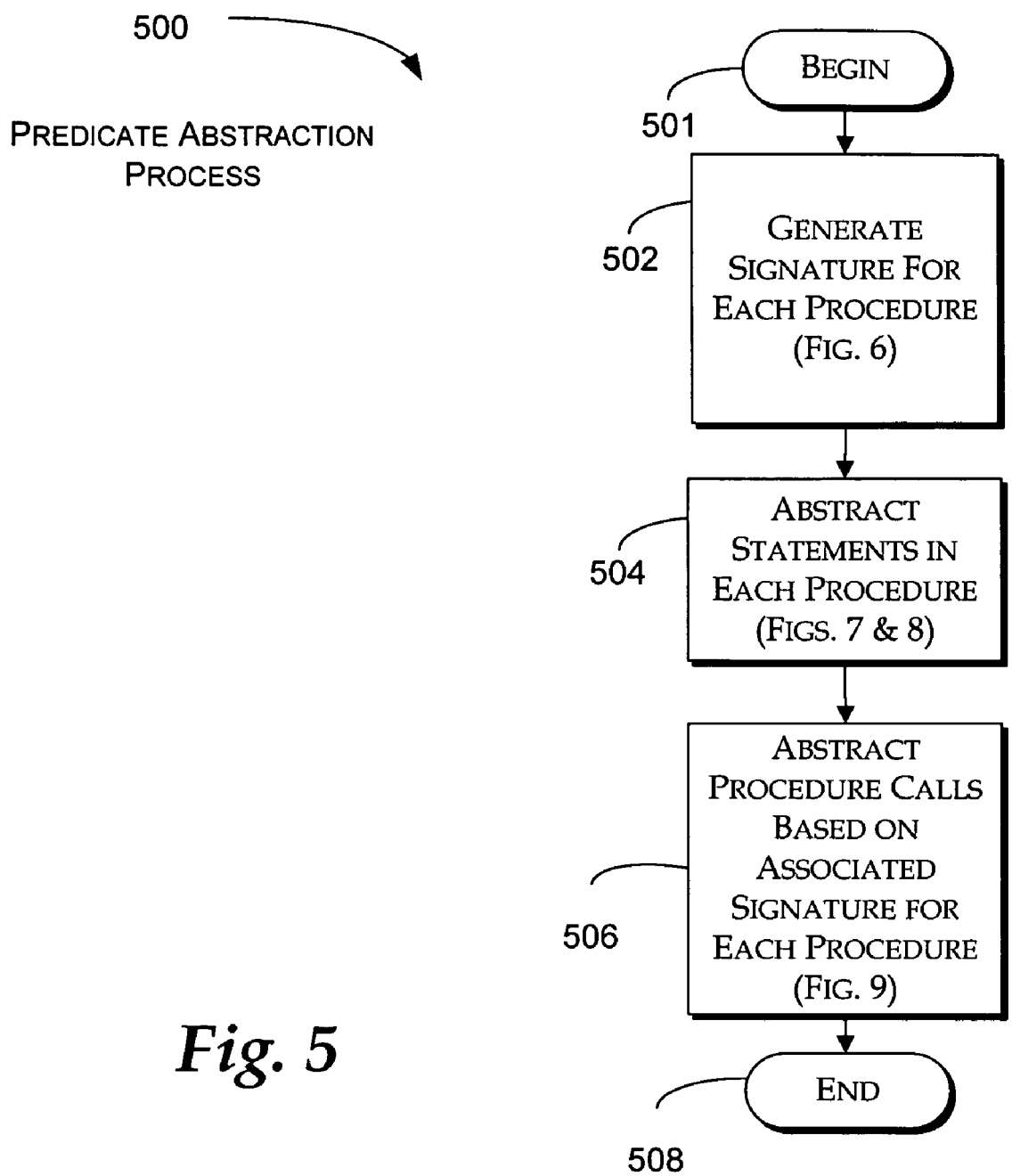
FIG. 5 is a logical flow diagram illustrating an overview of a predicate abstraction process.

FIG. 5 is a logical flow diagram illustrating an overview of a predicate abstraction process. The process begins at block 501, where a program written in any industrial programming language, such as C, JAVA, and the like, is available for abstraction. If necessary, the program has been converted into a simple intermediate form in which: (1) all intra-procedural control-flow is accomplished with if-then-else statements and gotos; (2) all expressions are free of side effects and do not contain multiple dereferences of a pointer (e.g., **p); and (3) a procedure call only occurs at the top-most level of an expression. With respect to item 3, for example, an expression such as "z=x+f(y);" is replaced with two expressions as follows: "t=f(y);" and "z=x+t;". In addition, at block 501, a set of predicates is available. This set of predicates may be created automatically from the properties, may be iteratively updated, may be supplied by the authors of the program, or may be generated by any other means. The process continues at block 502.

At block 502, the process generates a signature for each of the procedures. As mentioned above, the signature provides information to the calling procedure regarding scope of various identifiers and predicates. This scope information allows the abstraction process the ability to properly generate the call to the procedure in the abstract program. The process for generating a signature will be discussed in more detail below in conjunction with FIG. 6. The process continues at block 504.

At block 504, each statement in the program is abstracted. Generally, each statement is abstracted into one or more predicate statements for the boolean program. Because tools that use the abstracted boolean program are concerned with how each statement affects the predicates, the predicate statements in the boolean program reflect the effect that the statement will have on each predicate. The generation of the predicate statement will be discussed in more detail below in conjunction with FIGS. 7 and 8. The process continues at block 506.

At block 506, each procedure call is abstracted. The signature generated for each procedure in block 502 is used when abstracting the corresponding procedure call. Briefly, the predicate abstraction process of the present invention performs predicate abstraction on a procedure call by computing actual values for each formal parameter predicate and passing the actual value into the call. In addition, the predicate abstraction process computes return values from the called procedure. Finally, the predicate abstraction process updates each local predicate in the procedure whose value may have changed as a result of the call. The abstraction of the procedure calls will be discussed in more detail below in conjunction with FIG. 9. Once the procedure calls have been abstracted, processing ends at block 508, and the abstraction of the program is complete.

As one skilled in the art will appreciate, the abstraction process 500 described above may perform the processing described in blocks 502-506 in various orders. For example, the abstraction process 500 may abstract the procedure calls (e.g., block 506) before abstracting the statements (e.g., block 504). In addition, the abstraction process 500 may perform only a portion of the processing in each block and then later complete the processing. For example, the abstraction process may perform the processing in blocks 502-506 for one procedure, then repeat the processing in blocks 502-506 for each of the other procedures.

Figure 6:
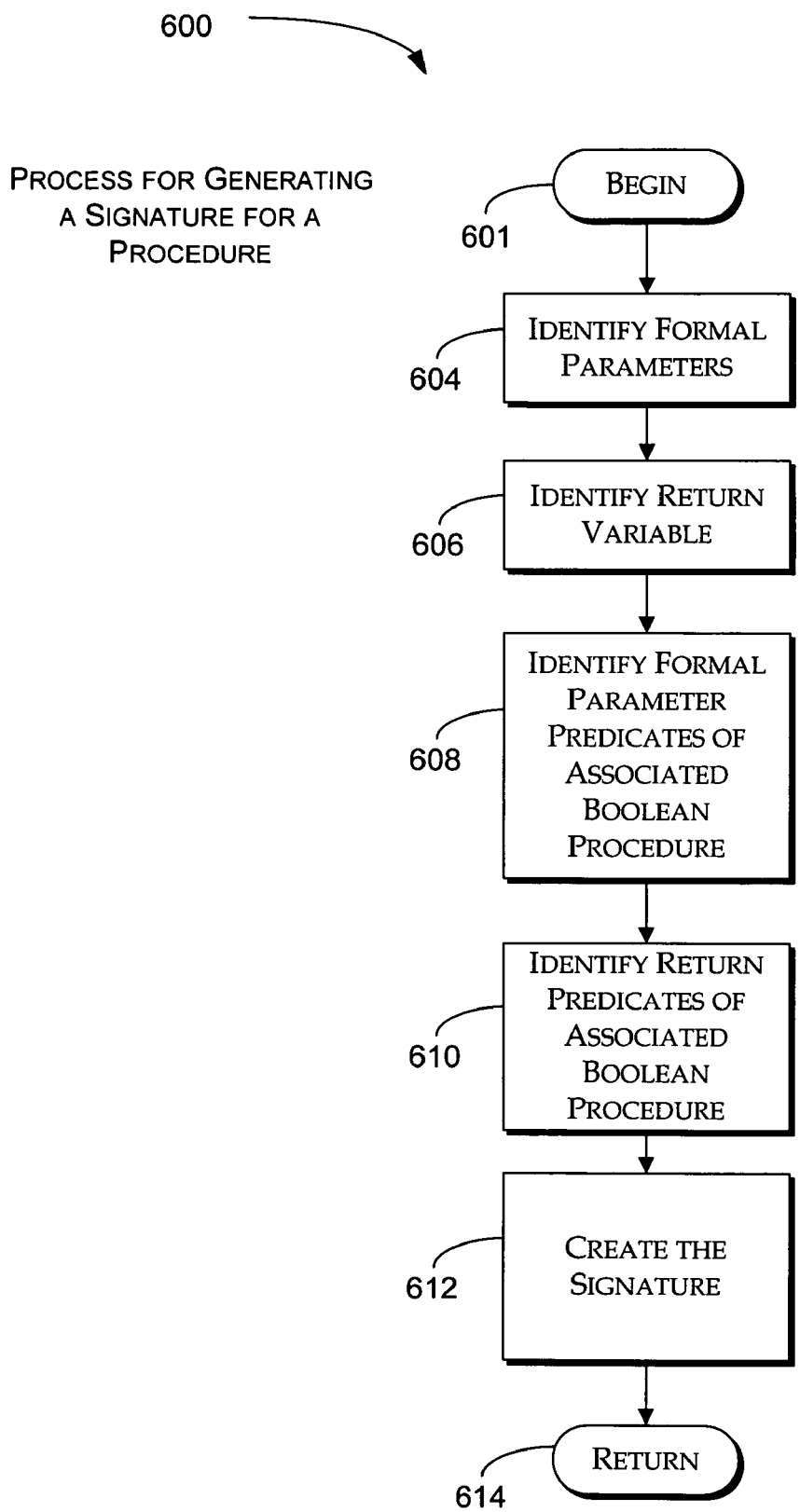
FIG. 6 is a logical flow diagram illustrating a process for determining a procedure call signature for use in the predicate abstraction process shown in FIG. 5.

FIG. 6 is a logical flow diagram illustrating an exemplary process for generating a signature for a procedure that may be used in the predicate abstraction process shown in FIG. 5. The process begins at block 601, where the predicate abstraction process has identified a procedure that it desires to abstract. Processing continues to block 604.

At block 604, the formal parameters (i.e., $F_R$) of the procedure are identified. The formal parameters appear in the header of the procedure declarations as arguments. Processing continues at block 606.

At block 606, the return variable (i.e., r) of the procedure is identified. Because the return variable may affect the calling procedure, the calling procedure needs to have this information to accurately reflect the possible effect on its statements. Processing continues at block 608.

At block 608, the formal parameter predicates (i.e., $E_f$) of the associated boolean procedure are identified. As discussed above, if the scopes of the associated variables are both local and global, the predicate $\phi$ is defined as a local predicate $\phi_L$. If the scope of the predicate is local, but the predicate does not refer to any local variables 312-324, the predicate $\phi$ is defined as a formal predicate $\phi_F$. Processing continues at block 610.

At block 610, the return predicates (i.e., $E_r$) of the associated boolean procedure are identified. The boolean procedure can have more than one return predicate. Processing continues at block 612.

At block 612, the signature for the procedure is created based on the formal parameters, the return variable, the formal parameter predicates, and the return predicates. One exemplary syntax for the signature is illustrated in FIG. 4 and is as described above. Processing ends at block 614.

Figure 7:
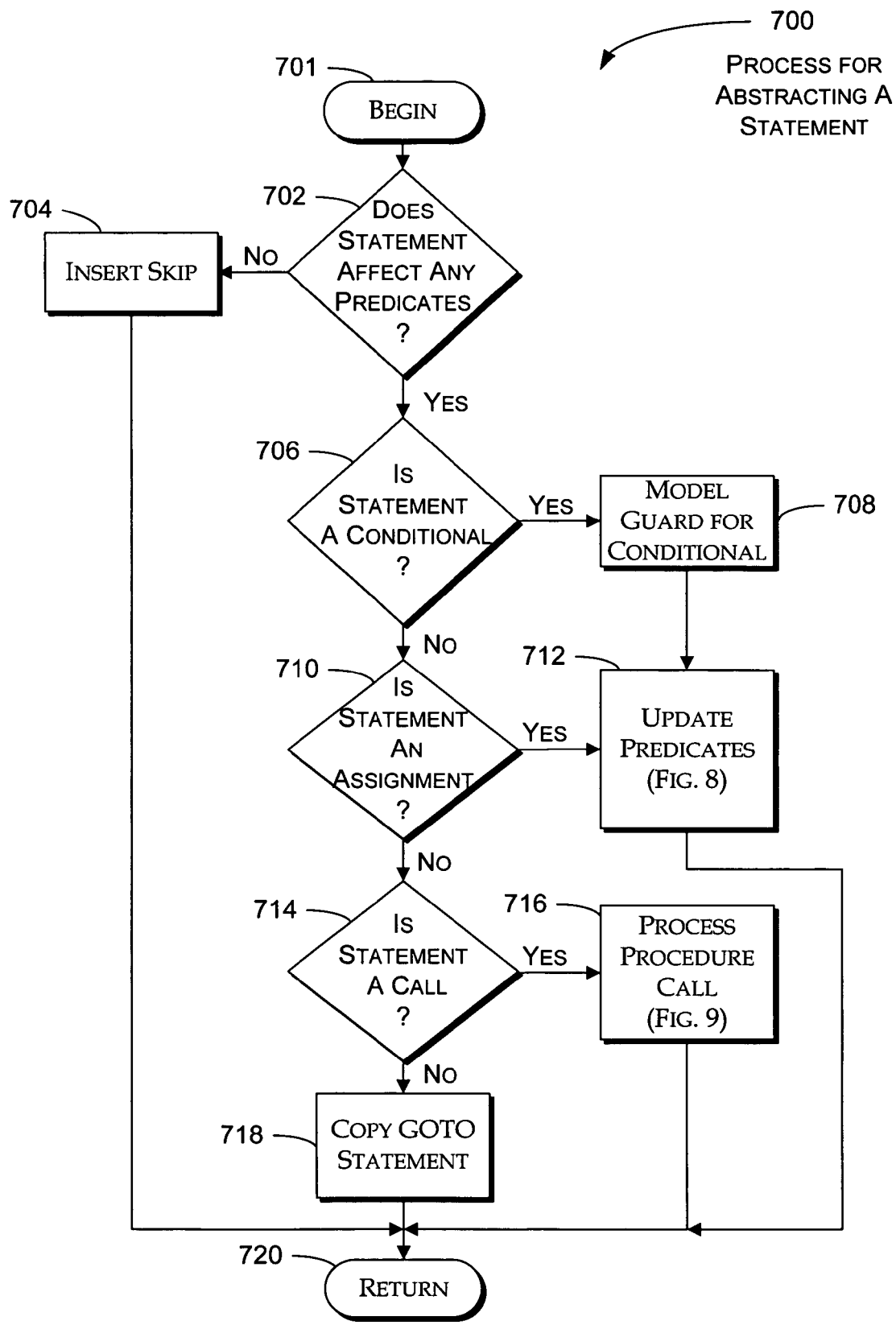
FIG. 7 is a logical flow diagram illustrating a statement abstraction process for use in the predicate abstraction process shown in FIG. 5.

FIG. 7 is a logical flow diagram illustrating a statement abstraction process for use in the predicate abstraction process shown in FIG. 5. The process begins at block 701, where a statement is ready to be abstracted. Processing continues at decision block 702.

At decision block 702, a determination is made whether the statement affects any of the predicates. Because the abstract program models the effect of the original program on the predicates, the statements that do not affect any of the predicates do not need to be included in the boolean program. Thus, if the statement does not affect any of the predicates, the process continues at block 704.

At block 704, a skip instruction is inserted into the boolean program. The skip instruction may be thought of as a "no-op" in the boolean program. The processing for this statement is then complete and proceeds to return block 716.

Returning to decision block 702, if the statement does affect one or more of the predicates, processing continues at decision block 706.

At decision block 706, a determination is made whether the statement is a conditional statement. If the statement is not a conditional statement, processing continues at decision block 710.

At decision block 710, a determination is made whether the statement is an assignment. If the statement is an assignment, the process proceeds to block 712 discussed below. However, if the statement is not an assignment, processing continues at decision block 714. At decision block 714, a determination is made whether the statement is a procedure call. If the statement is a procedure call, the process proceeds to block 716. At block 716, the procedure call is processed. Processing of the procedure call is described below in conjunction with FIG. 9. Once the procedure call is processed, processing is complete and proceeds to return block 720.

Returning to decision block 714, if the statement is not a procedure call, the process proceeds to block 718 where the process assumes that the statement is a "GOTO" statement and copies the "GOTO" statement to the boolean program, and processing proceeds to return block 720.

Returning to decision block 706, if the statement is a conditional statement, processing continues at block 708. At block 708, the guard for the conditional is modeled. At the beginning of the then branch, the guard (e.g., the predicate) must hold in order for the then branch to be processed. Similarly, at the beginning of the else branch, the negative of the guard must hold in order for the else branch to be processed. Therefore, the predicate abstraction process incorporates an "assume" qualifier in the boolean program. The "assume" qualifier is used to retain the semantics of the original conditional test. The "assume" does not fail. If the predicate φ with the assume qualifier does not hold at the point of the assume qualifier, the current execution trace is simply ignored. The determination of the predicate φ and the negative predicate ¬φ for the assume qualifier is discussed in conjunction with FIG. 8.

In addition, the guard in the program is replaced with a non-deterministic symbol, such as "*". The non-deterministic symbol denotes that either path of the conditional may be chosen when modeling occurs. Continuing with the example above in Table 2, the abstraction of the conditional with respect to the three predicates (i.e., *p<=0, x==0, r==0) is as follows:

```
if (*) {
    assume ({x == 0} ⇒ {*p <= 0});
    ...
} else {
    assume ({x == 0} ⇒ ! {*p <= 0});
    ...
}.
```

From block 708, after the guard for the conditional is modeled, processing continues at block 712.

At block 712, the predicates that are affected by the assignment are evaluated to determine the corresponding predicate statements that properly model the possible effect of the statement on each of the affected predicates. The predicate statements are then written to the boolean program. Computing the predicate statements is described below in conjunction with FIG. 8. Once the predicate statements are computed, processing is complete and proceeds to return block 720.

Figure 8:
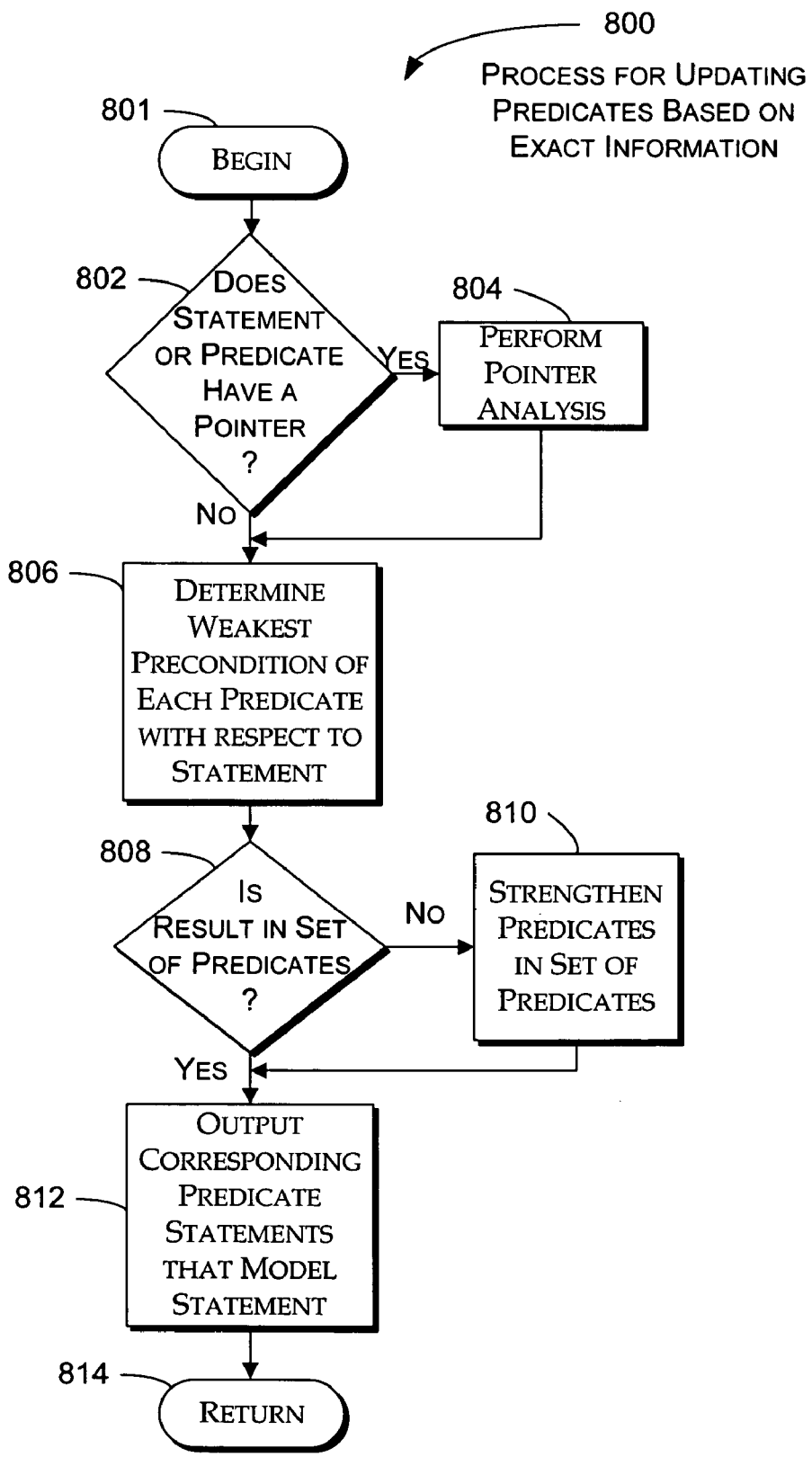
FIG. 8 is a logical flow diagram illustrating a process for evaluating predicates for use in the statement abstraction process shown in FIG. 7.

FIG. 8 is a logical flow diagram illustrating a process for updating predicates that are affected by a statement during the statement abstraction process shown in FIG. 7. The process begins at block 801, where there is a statement available for abstraction that will affect one or more of the predicates. Processing continues at decision block 802.

At decision block 802, a determination is made whether the statement or any of the affected predicates contain a pointer. Pointers present problems in predicate abstractions because the pointer may alias various variables, and, thus, affect many different predicates. The impact of pointers on the predicate abstraction process will be described below in conjunction with block 804 after the processing within blocks 806-812 have been explained. Therefore, assuming for the time being that there are not any pointers in either the statement or in any of the predicates, processing continues at block 806.

At block 806, the weakest precondition of each predicate with respect to the statement is determined. The weakest precondition is defined as the weakest predicate whose truth before the statement s forces the truth of the predicate φ after the statement s terminates. The weakest precondition is represented by the equation WP(s,φ). The following discussion provides a brief overview of the weakest precondition computation to the extent necessary to understand the present invention. In addition, the following discussion provides a detailed discussion of the relevance of the weakest precondition computation to the present invention. Additional information on the weakest precondition computation may be found in the book entitled *A Discipline of Programming*, by E. Dijkstra, published by Prentice-Hall, 1976 and in the book entitled *The Science of Programming*, by D. Gries, published by Springer-Verlag, 1981.

In general, for a statement s occurring between points p and q in program P and a predicate φ in the set of predicates E, there is a boolean variable b that corresponds to the predicate φ. The weakest precondition is used to conservatively model the effect of s on each of the predicates E. As defined above, the weakest precondition is represented by the equation WP(s,φ). When the statement s is an assignment, such as "x=e", the weakest precondition results in computing WP(x=e,φ). For this computation, x is a scalar variable, e is an expression of the appropriate type and φ is a predicate. The computation is achieved by replacing all occurrences of "x" with "e" in the predicate φ. This is denoted as φ[e/x] (i.e., replace x with e in predicate φ). In order to understand the computation of the weakest precondition, an example is provided. In the example, the assignment is "x=x+1" and the predicate is "x<5. First, the assignment "x+1" is replaced for each "x" in the predicate "x<5". Therefore, the computation of the weakest precondition yields the following:

$$WP(x=x+1, x<5) => (x+1)<5 => (x<4).$$

This results in "x<4" as the weakest precondition. This denotes that if "x<4" is TRUE before the statement "x=x+1", then the predicate "x<5" is TRUE after the statement "x=x+1" terminates. Once the weakest precondition is computed, processing continues at decision block 808.

At decision block 808, a determination is made whether the weakest precondition is in the set of predicates E defined for the program P. Proceeding further with the example above and defining the set of predicates E as follows: E={(x<5), (x=2)}, one notes that the weakest precondition (e.g., "x<4") is not within the set of predicates E. When the computed weakest precondition is not within the set of predicates, processing continues at block 810.

At block 810, the weakest precondition is strengthened to an expression over the predicates in the set of predicates E. In general, strengthening the weakest precondition involves a call to a theorem prover that implements the required decision procedures. The following discussion provides a brief overview of the strengthening computation to the extent necessary to understand the present invention. In addition, the following discussion provides a detailed discussion of the relevance of the strengthening computation to the present invention. The strengthening computation uses tools called theorem provers. Additional information on theorem provers may be found in an article entitled "Simplify theorem prover", by D. Detlefs, G. Nelson, and J Saxe, and in an article entitled "Techniques for Program Verification", by G. Nelson, Technical Report CSL81-10, Xerox Palo Alto Research Center, 1981.

In general, the strengthening of the predicate is achieved by computing a set of cubes over the boolean variables V. The cube of the boolean variables V is a conjunction $c_{i_1} \hat{} \ldots \hat{} c_{i_k}$, where each $c_{ij}$ is an element of the set of boolean variables $\{b_{ij}, \neg b_{ij}\}$ for some boolean variable $b_{ij}$ that is an element in the set of boolean variables V (i.e., $b_{ij} \in V$). For a boolean variable $b_{ij}$ that is an element in the set of boolean variables V, let $\epsilon(b_i)$ denote the corresponding predicate $\phi_i$. In addition, let $\epsilon(\neg b_i)$ denote the corresponding predicate $\neg \phi_i$. Then, $\epsilon$ is extended to cubes and disjunctions of cubes in the natural way. For any predicate $\phi$ and any set of boolean variables V, let $Fv(\phi)$ denote the largest disjunction of cubes c over V such that $\epsilon(c)$ implies $\phi$. The predicate $\epsilon(Fv(\phi))$ represents the weakest predicate over $\epsilon(V)$ that implies $\phi$. Thus, continuing with the example above, in which x<4 is the predicate to be strengthened, $\epsilon(Fv(x<4))=(x=2)$. As one can note, the predicate "x=2" is now one of the predicates in the set of predicates E, and "x=2" implies x<4.

While on the topic of strengthening the predicate, there is also a corresponding computation that weakens the predicate. The weakening computation is represented by $Gv(\phi)$ as $\neg Fv(\neg \phi)$. Thus, the predicate $\epsilon(Gv(\phi))$ represents the strongest predicate over $\epsilon(V)$ that is implied by $\phi$. Thus, in the discussion above regarding the abstraction of conditional, at the beginning of the then branch, the condition $Gv(\phi)$ is known to hold. Similarly, at the beginning of the else branch, the condition $Gv(\neg \phi)$ is known to hold. Thus, the general abstraction of a conditional yields the following:

```
if(*) {
    assume (Gv(φ))
    ...
}else {
    assume (Gv(¬φ))
    ...
}.
```

Once the strengthening of the predicates has been completed, processing continues to block 812 as if the weakest predicate had been in the set of predicates at decision block 808.

At block 812, based on the set of predicates that were computed, predicate statements that correspond to the statement are output to the boolean program. Typically, there will be more than one predicate statement that corresponds to the statement being abstracted in the program P. These predicate statements model the effect of the statement on the predicates. Briefly, each predicate statement assigns a three-value logic to one of the affected boolean variables. The three-value logic includes TRUE, FALSE, and UNKNOWN. The logic for the UNKNOWN is provided by a function that non-deterministically chooses either TRUE or FALSE as is described below in detail.

The boolean variable $b_i$ in BP(P,E) will have the value TRUE after label l in boolean program BP if $Fv(WP(x=e,\phi_i))$ holds before label l, where x=e is the statement at label l. Similarly, boolean variable $b_i$ in BP(P,E) will have the value FALSE after label l in boolean program BP if $Fv(WP(x=e,\neg \phi_i))$ holds before label l. These two results are mutually exclusive and cannot be simultaneously true. When neither of these two predicates hold before label l, boolean variable $b_i$ is set to a function named unknown( ). The function unknown( ) provides a non-deterministic choice in the boolean program. The function unknown( ) may occur when the predicates in E are not strong enough to provide appropriate information or may occur because the theorem prover is incomplete. The boolean program will contain parallel assignments at label l. For each boolean variable $b_n$, the right-hand side of the parallel assignment statement for the boolean variable $b_n$ will take the following form:

$$\text{choose}(Fv(WP(x=e,\phi_n)), Fv(WP(x=e, \neg \phi_n))), \qquad \text{eq. 1}$$

where the choose function is defined as follows:

```
bool choose(bool pos, bool neg) {
    if (pos) {return true; }
    if (neg) {return false; }
    return unknown( );
}.
```

The unknown( ) function is defined as follows:

```
bool unknown( ) {
    if (*) { return true; }
    else { return false; }
}.
```

As shown, the function unknown( ) uses the control expression "*". This control expression signals the tool using the boolean program to non-deterministically choose either the then branch or the else branch. Depending on which branch is chosen, either the TRUE value or the FALSE value is returned.

Typically, a tool that takes as input the boolean program (e.g., model checker 212 shown in FIG. 2) may use the boolean program to identify a problem. The cause of the problem may be the result of a bug in the program P, an imprecision in the boolean abstraction, and the like. Processing continues to return block 814.

Returning to decision block 802, if either the statement or the predicates have a pointer, processing continues at block 804. As mentioned earlier, pointers present a difficult challenge during any type of abstraction process. The abstraction process of the present invention overcomes this problem as described below. First, in order to minimize the imprecision associated with reasoning about pointers, the predicate abstraction process 800 performs a pointer analysis at block 804. The pointer analysis determines the possible aliases of any pointer. By performing the pointer analysis, the present invention improves the precision of the weakest precondition computation for pointers performed at block 806.

In general, the pointer analysis determines whether a variable x and a variable y may be aliased at a particular location (e.g., before assignment statement x=e) within program P. In one exemplary implementation, a points-to-algorithm is used. The points-to-algorithm obtains flow-insensitive, context-insensitive may-alias information. Additional information on an illustrative points-to algorithm may be found in an article entitled "Unification-based pointer analysis with directional assignments", by M. Das, Programming Language Design and Implementation, pages 35-46, ACM, 2000.

Once the pointer analysis is performed, processing continues at blocks 806-814 as described above with additional consideration being taken on the impact of the pointers. In this regards, at block 806, the weakest precondition computation may not be able to be performed by replacing only occurrences of "x" with "e" in the predicate φ as described above. For example, given the assignment "x=3" and the predicate "*p>5", if only the occurrences of "x" were replaced with "3" in the predicate "*p>5", the result would be "*p>5". However, if x and p are aliases, then (*p>5) cannot be true after the assignment to x. Likewise, a similar problem occurs when a pointer dereference is on the left-hand side of the assignment.

The abstraction process of the present invention overcomes this problem by defining a location as either a variable, as a structure field access from a location, or as a dereference of a location. Then, considering the computation of the weakest precondition WP(x=e,φ) in which x is a location and y is a location mentioned in the predicate φ, there are two cases to consider. The first case is when x and y are aliases. In this case, the assignment of e to x will cause the value of y to become e. The second case is when x and y are not aliases. In this second case, the assignment of e to x will leave y unchanged. The notation associated with the predicate that denotes these two cases is as follows:

$$\phi[x,e,y]=(\&x=\&y\hat{\phi}[e/y])v(\&x\neq\&y\hat{\phi}). \quad \text{eq. 2}$$

Let $y_1, y_2, \ldots, y_n$, be the locations mentioned in the predicate φ. Then, the weakest precondition WP(x=e,φ) is defined to be φ[x,e,y_1] [x,e,y_2] ... [x,e,y_n]. Thus, continuing with the above example, the weakest precondition is computed as follows:

$$WP(x=3, *p>5)=(\&x=p\hat{3}>5)v(\&x\neq p\hat{*}p>5). \quad \text{eq. 3}$$

In the absence of alias information, if the predicate φ has k locations occurring in it, the weakest precondition will have $2^k$ syntactic disjuncts. Each disjunct reflects a possible alias scenario of the k locations with x. If the pointer analysis determines that variables x and y can not be aliased before that particular location, the abstractor does not need to compute the disjuncts representing a scenario in which x is aliased to y. Instead, the abstraction process in accordance with the present invention includes only the disjuncts representing a scenario in which x is not aliased to y. Processing continues to decision block 808 where the weakest precondition is strengthened if necessary, as described above.

An example of the predicate statements that are generated when a pointer is involved is now discussed. The example is from the procedure foo( ) described in Table 2 above. The statement being abstracted is "*p=*p+x". The predicates are "*p<=0", "x==0", and "r==0". For this example, a pointer alias analysis (block 804) reveals that *p cannot alias x or r. Therefore the weakest precondition WP(s,*p≦0) is (*p+x)≦0. Then ε(Fv(*p+x≦0))=(*p≦0)^(x=0). Similarly, WP(s,⌐(*p≦0)) is ⌐((*p+x)≦0), and ε(Fv(⌐(*p+x≦0)))=⌐(*p≦0)^(x=0). The weakest preconditions of s with respect to the predicates (x=0) and (r=0) are the respective predicates themselves, because *p cannot alias x or r. Thus, the boolean program BP(P,E) will contain the following statement in place of the given assignment statement:

```
{p*<=0}, {x==0}, {r==0} =
  choose({*p<=0} && {x==0}    ,! {*p<=0} && {x==0}),
  choose({x==0}               ,!{x==0}),
  choose({r==0}               ,!{r==0});.
```

The above predicate statement then reflects the effect of the statement (i.e., *p=*p+x) on the three predicates. Later, a tool (e.g., the model checker 212) that inputs the boolean program can determine whether the effect of the statement on each predicate is TRUE or FALSE. Processing ends at block 814.

Figure 9:
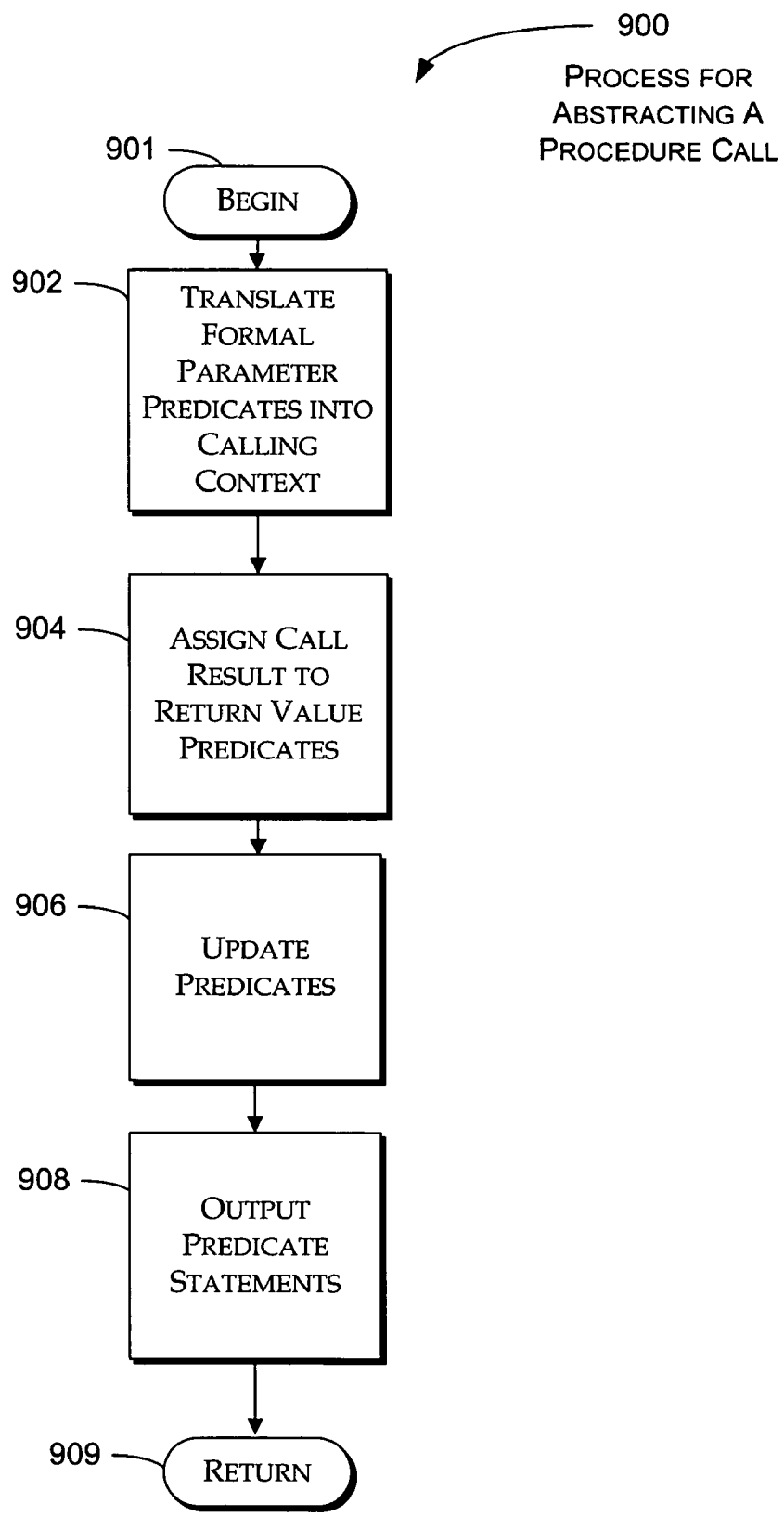
FIG. 9 is a logical flow diagram illustrating a procedure call abstraction process for use in the predicate abstraction process shown in FIG. 5.

FIG. 9 is a logical flow diagram illustrating a procedure call abstraction process for use in the predicate abstraction process shown in FIG. 5. The process begins at block 901, where there is a procedure call available for abstraction. The signature of the procedure call has already been determined. In the following discussion, the calling procedure is referred to as calling procedure C (e.g., procedure foo( ) in Table 2 above) and the called procedure is referred to as called procedure R (e.g., procedure bar( ) in Table 1 above). Then, the program call within calling procedure C at label l is represented as $v=R(a_1, \ldots, a_j)$, where v represents the return value, and $a_1$-$a_j$ represent the arguments that are passed into the called procedure R. The abstraction process produces a corresponding procedure call for boolean called procedure R' in the boolean calling procedure C' at a label l in the boolean abstraction BP(P,E). As mentioned earlier, the arguments $a_1$-$a_j$ may contain pointer aliases and the like. As described above in conjunction with FIG. 6, the signatures of calling procedures C and called procedure R are ($F_C$, $r_C$, $E_{fC}$, $E_{rC}$) and ($F_R$, $r_R$, $E_{fR}$, $E_{rR}$), respectively. Processing continues at block 902.

At block 902, the formal parameter predicates (e.g., 370 in FIG. 3) of the boolean called procedure R' are translated into the calling context associated with boolean procedure C'. As defined above, the formal parameter predicates $E_{fR}$ of called procedure R is the subset of predicates that are local to called procedure R but do not refer to any local variables of called procedure R. For the translation of the formal parameter predicates $E_{fR}$ into the calling context, each formal parameter predicate (represented as "e") in $E_{fR}$ is translated to some predicate e' by the following equation:

$$e'=e[a_1/f_1, a_2/f_2, \ldots, a_j/f_j], \text{ where } F_R=\{f_1, f_2, \ldots f_j\}. \quad \text{eq. 4}$$

In other words, each formal parameter in e is replaced with the corresponding actual parameter of the call, so e' represents the predicate e translated to the calling context.

The actual parameter computed for the formal e is given by the following equation:

$$\text{choose}(Fvc \cup vc(e'), Fvc \cup vc(\neg e')). \quad \text{eq. 5}$$

As discussed above, the above equation represents the choose function with two arguments: the largest disjunction of cubes over the global variables (VG) and local variables of calling procedure C (VC) with respect to predicate e' and the largest disjunction of cubes over the global variables (VG) and local variables of procedure C (VC) with respect to negative predicate ⌐e'. Thus, the number of times the choose function appears in a predicate statement when abstracting a procedure call depends on the number of formal parameters in the called procedure R. Processing continues at block 904.

At block 904, the return values from the call to boolean called procedure R' are assigned. For discussion, assume that $E_r=\{e_1, \ldots, e_p\}$. The procedure abstraction process 900 creates p new local boolean variables in boolean calling procedure C' (e.g., $T=\{t_1, \ldots, t_p\}$). The process 900 then assigns the return values of boolean called procedure R' to the new local variables in parallel as follows:

$$t_1, \ldots t_p = R'(\ldots); \quad \text{eq. 6}$$

Processing continues at block 906.

At block 906, any predicates in the calling context whose values may have changed as a result of the call are updated. These predicates include any predicate in the subset of predicates in E that are local to C (i.e., $E_c$) that mentions the return variable of R. In addition, any predicate of $E_C$ that mentions a global variable, a dereference of an actual parameter to the call, or an alias of either of the two is updated. The procedure abstraction process 900 applies a pointer alias analysis to the program in order to determine a conservative over-approximation (denoted as $E_u$) of the predicates to update. For discussion, let the set of predicates E' be defined as follows:

$$E' = (E_C \cup E_G) - E_u. \quad \text{eq. 7}$$

The predicates in the conservative over-approximation $E_u$ are updated based on the predicates in E', whose values did not change, along with the predicates $E_r$. The boolean variables V' in BP(P,E) corresponding to E' are defined as follows:

$$V' \subseteq V_C \cup V_G. \quad \text{eq. 8}$$

Similar to the translation of the formal parameter predicates to the calling context, the return predicates $E_r$ are translated to the calling context. In particular, for each $e_i \in E_r$, the translated return predicate is as follows:

$$e_i' = e_i[v/r, a_1/f_1, a_2/f_2, \ldots, a_j/f_j], \text{ where } F_R = \{f_1, f_2, \ldots f_j\} \text{ and}$$

$$E_r' = \{e_1', \ldots, e_p'\}. \quad \text{eq. 9}$$

Define $\epsilon(t_i) = e_i$, for each $t_i \in T$. Then, for each $e \in E_u$, the corresponding boolean variable $b \in V_C$ is assigned the following value:

$$\text{choose}(F_{V' \cup T}(e), F_{V' \cup T}(\neg e)). \quad \text{eq. 10}$$

An example of an abstraction of a procedure call is now given. Continuing with the procedures bar( ) and foo( ) described above in Tables 1 and 2, respectively, the abstraction of the procedure call, "bar(p,x)" in foo( ) is described. In this example, procedure bar( ) represents the called procedure R and procedure foo( ) represents the calling procedure C. Recall from above, that the formal parameter predicates $E_{fR}$ of called procedure bar( ) are {*q<=y, y>=0} and the return predicates $E_{rR}$ are {*q<=y, y=l_1}.

The translation of the formal parameter predicates of the called boolean procedure bar( )' into the calling context (block 902) is {*p<=x, x>=0} and results in the parameter predicates represented by statements 1 and 2 below. The assignment of the return values (block 904) results in statement 3 below. The updating of the predicates whose value may have changed as a result of the call (block 906) results in statements 4 and 5 below. Thus, the abstraction of this call in the boolean program yields the following predicate statements:

1. prm1=choose({*p<=0}&&{x==0}, !{*p<=0}&&{x==0});
2. prm2=choose({x==0}, false);
3. t1, t2=bar(prm1,prm2);
4. {*p<=0}=choose(t1&&{x==0}, !t1&&{x==0});
5. {r==0}=choose(t2&&{x==0}, !t2&&{x==0};.

FIG. 10 graphically illustrates portions of an exemplary program 1002 along with the corresponding portions of a boolean program 1004 after the abstractor 202 performs the predicate abstraction process in accordance with the present invention. The boolean program 1004 may not be the exact output of the predicate abstraction process of the present invention, but rather may be a simplified version that provides better readability.

In general, the program 1002 has a procedure named "partition" (hereinafter, referred to as partition procedure 1006) that takes a pointer to a list of integers l 1008 and an integer v 1010. Partition procedure 1006 partitions the list into two lists. A first list contains the cells with a value greater than v. The second list contains the cells with a value less than or equal to v.

A predicate input file 1012 specifies a set of four predicates 1014-1017 that are local to the partition procedure 1006. The boolean program 1004 declares four boolean variables 1031-1034 of type bool in boolean partition procedure 1030. Each of the four boolean variables 1031-1034 corresponds to one of the four predicates 1014-1017. The initial values of the boolean variables 1031-1034 are unconstrained.

Each of the statements in program 1002 corresponds to one or more predicate statements in boolean program 1004. The predicate statements capture the effect of the original statement on the predicates 1014-1017. For example, original statement 1018 that assigns "NULL" to "prev" (e.g., "prev=NULL") is translated into two predicate statements 1050 1051. The first predicate statement 1050 (i.e., {prev==NULL}=true;) reflects the truth of predicate 1015 (i.e., prev==NULL) after the assignment. The second predicate statement 1031 (i.e., "{prev->val>v}=unknown( );") reflects that the value of the predicate 1017 (i.e., prev->val>v) is indecisive after this assignment. Each of the other original statements in program 1002 have been converted using the process described above and will not be individually discussed. However, one will note that the comments that appear in the boolean partition procedure 1030 identify the original statement that corresponds to the predicate statement.

The above specification, examples and data provide a complete description of the manufacture and use of the composition of the invention. Since many embodiments of the invention can be made without departing from the spirit and scope of the invention, the invention resides in the claims hereinafter appended.

We claim

1. A computer-implemented method for generating a boolean program that is a predicate abstraction of a program having a plurality of code statements, the method comprising:

receiving a plurality of predicates that define properties for the program;

for each code statement in the program, identifying one or more predicates of interest out of the plurality of predicates, wherein the predicates of interest are affected by a procedure call in the program;

for each particular procedure call in the program, generating one or more predicate statements that describe an effect of the particular procedure call on the one or more predicates of interest, wherein generating the one or more predicate statements that describe the effect of the procedure call includes:

translating each formal parameter of a called boolean procedure into a calling context associated with a calling boolean procedure, assigning each return value of the called boolean procedure to a new variable in the calling boolean procedure, translating return predicates of the called boolean procedure into the calling context, and updating the predicates of interest; and generating the boolean program based on the predicate statements.

2. The computer-implemented method of claim 1, wherein the program is written in a high-level programming language.

3. The computer-implemented method of claim 2, wherein the high-level programming language includes a C language.

4. The computer-implemented method of claim 2, wherein the high-level programming language includes a JAVA language.

5. The computer-implemented method of claim 1, wherein the boolean program includes a control-flow structure substantially similar to the program.

6. The computer-implemented method of claim 1, wherein the code statement includes a pointer.

7. The computer-implemented method of claim 6, wherein generating the predicate statements that describe the effect of the code statement further comprises:
   performing a pointer analysis to determine possible aliases of the pointer; and
   computing the weakest precondition on the possible aliases of the pointer.

8. The computer-implemented method of claim 7, wherein computing the weakest precondition on the possible aliases of the pointer further comprises:
   computing the weakest precondition on a first case when the pointer has an alias; and
   computing the weakest precondition on a second case when the pointer does not have an alias.

9. The computer-implemented method of claim 1, wherein generating the predicate statements includes outputting a boolean expression for each predicate of interest in the boolean program.

10. The computer-implemented method of claim 9, wherein the boolean expression includes a true value, a false value, and a function that non-deterministically selects one of the true value and the false value when the effect is indeterminable.

11. The computer-impkmented method of claim 1, wherein generating the predicate statements further comprises detennining a signature for the procedure call.

12. The computer-implemented method of claim 11, wherein the signature includes a set of formal parameters of the procedure call, a return variable associated with the procedure call, a set of formal parameter predicates associated with the procedure call, and a set of return predicates associated with the procedure call.

13. A computer-readable storage medium having computer-executable components for generating a boolean program that is a predicate abstraction of a program having a plurality of code statements, comprising:

an abstracter that is configured to:
   receive a set of predicates and a program written in a high-level programming language; and
   generate at least one predicate statement for each code statement in the program, wherein said generate at least one predicate statement for each code statement in the program includes:
translating each formal parameter of a called boolean procedure into a calling context associated with a calling boolean procedure,
assigning each return value of the called boolean procedure to a new variable in the calling boolean procedure,
translating return predicates of the called boolean procedure into the calling context, and
updating predicates that are affected by the procedure call.

14. The computer-readable storage medium of claim 13, wherein the code statements include a pointer.

15. The computer-readable storage medium of claim 14, wherein the abstractor is further configured to:
   perform a pointer analysis on the pointer to determine possible aliases of the pointer;
   compute the weakest precondition on a first case when the pointer has an alias; and
   compute the weakest precondition on a second ease when the pointer is not aliased.

16. A computer-readable storage medium for generating a boolean program that is a predicate abstraction of a program having a plurality of code statements, encoded with a computer-readable first data structure comprising:
   a boolean procedure field that defines a beginning and an ending to a boolean procedure within a boolean program;
   a predicate field defining a set of predicates relevant to an associated boolean procedure field, wherein the predicate field includes a type field, a boolean variable field, and an initial value field;
   a predicate statement field including a first field including an identifier for one predicate in the set of predicates, and a second field including a boolean expression representing the effect of a procedure call in a program on the one predicate identified in the first field; and
   a guard field for defining a non-deterministic symbol and a qualifier, wherein the non-deterministic symbol signals that a first path and a second path associated with the guard field are chosen non-deterministically during modeling.

17. The computer-readable storage medium of claim 16, further comprising a formal parameter predicate field and a return predicate field that provide abstraction of the procedure call in the program.

* * * * *